(12) United States Patent
Paris et al.

(10) Patent No.: US 7,568,237 B2
(45) Date of Patent: Jul. 28, 2009

(54) ACCESS CONTROL LIST WITH CONVOLUTION-WEAKENED AUTHORIZATION

(75) Inventors: Steven Mark Paris, Brighton, MA (US); Tamela Louise Jamieson, Andover, MA (US)

(73) Assignee: Health Allianze, Andover, MA (US)

( * ) Notice: Subject to any disclaimer, the term of this patent is extended or adjusted under 35 U.S.C. 154(b) by 761 days.

(21) Appl. No.: 11/138,517

(22) Filed: May 26, 2005

(65) Prior Publication Data

US 2006/0272033 A1 Nov. 30, 2006

(51) Int. Cl.
- G06F 7/04 (2006.01)
- H04L 9/32 (2006.01)
- G06F 17/30 (2006.01)
- H04K 1/00 (2006.01)

(52) U.S. Cl. .............................. 726/27; 726/31; 726/32
(58) Field of Classification Search ................... 726/27, 726/31, 32
See application file for complete search history.

(56) References Cited

U.S. PATENT DOCUMENTS

| | | | |
|---|---|---|---|
| 7,305,702 B2 * | 12/2007 | Bell et al. ...................... | 726/5 |
| 7,389,270 B2 * | 6/2008 | Stefik et al. ................... | 705/51 |
| 2002/0184517 A1 * | 12/2002 | Tadayon et al. ............. | 713/200 |
| 2005/0144230 A1 * | 6/2005 | Russo et al. ................ | 709/204 |
| 2006/0206925 A1 * | 9/2006 | Dillaway et al. ............... | 726/5 |

* cited by examiner

*Primary Examiner*—Michael J Simitoski
(74) *Attorney, Agent, or Firm*—Kenneth F. Kozik (57) ABSTRACT

A system and method for granting and transmitting access rights to data, the method includes steps of: receiving a request for information relating to a specified individual, wherein the request identifies a person requesting the information; determining the degree of relationship between the person requesting the information and the individual to whom the information relates; retrieving access rights for the requesting person from a repository; determining the owner of the rights as well as the rights that owner has granted to secondary parties; and determining, managing and transmitting to second parties said access rights modified to permit or deny the second party to further transmit, modify, change or delete owner's information to third parties.

11 Claims, 7 Drawing Sheets

|  |  | Grandparent(s) |  |  |
|---|---|---|---|---|
| 0.00 | 0.00 | 0.50 | 0.00 | 0.00 |
|  | Cousins | Parents | Aunt(s)/Uncles |  |
| 0.00 | 0.25 | 0.75 | 0.50 | 0.00 |
|  | Sibling(s) | Self | Spouse |  |
| 0.00 | 0.75 | 1.00 | 0.75 | 0.00 |
| 0.00 | Niece(s)/Nephews | Children |  |  |
|  | 0.25 | 0.75 | 0.00 | 0.00 |
|  |  | Grandchildren |  |  |
| 0.00 | 0.00 | 0.50 | 0.00 | 0.00 |

FIG. 1

| | | | | |
|---|---|---|---|---|
| | | Grandparent(s) 0.50 | 0.00 | 0.00 |
| 0.00 | | Parents 0.75 | Aunt(s)/Uncles 0.50 | 0.00 |
| 0.00 | Cousins 0.25 | Self 1.00 | Spouse 0.75 | 0.00 |
| 0.00 | Sibling(s) 0.75 | Children 0.75 | 0.00 | 0.00 |
| 0.00 | Niece(s)/Nephews 0.25 | Grandchildren 0.50 | 0.00 | 0.00 |
| | | 0.00 | | |

FIG. 2

|  |  |  |  |  |  |
|---|---|---|---|---|---|
| None |  | None | Grandparents / Average | None | None |
| None | Cousins / Few | Parents / Most | Aunts/Uncles / Average |  | None |
| None | Siblings / Most | Self / All | Spouse / Most |  | None |
| None | Nieces/Nephews / Few | Children / Most | None |  | None |
| None |  | Grandchildren / Average | None |  | None |

Begin Convolution Run
Mask Array:

| | | |
|---|---|---|
| 0.750000 | 0.750000 | 0.750000 |
| 0.750000 | 1.000000 | 0.750000 |
| 0.750000 | 0.750000 | 0.750000 |

Original array:

| | | | | |
|---|---|---|---|---|
| 0.500000 | 0.000000 | 0.000000 | 0.000000 | 0.000000 |
| 0.000000 | 0.250000 | 0.750000 | 0.250000 | 0.000000 |
| 0.000000 | 0.750000 | 1.000000 | 0.750000 | 0.000000 |
| 0.000000 | 0.250000 | 0.750000 | 0.000000 | 0.000000 |
| 0.000000 | 0.000000 | 0.500000 | 0.000000 | 0.000000 |

Convolved array:

| | | | | |
|---|---|---|---|---|
| 0.329861 | 0.000000 | 0.000000 | 0.000000 | 0.000000 |
| 0.000000 | 0.250000 | 0.562500 | 0.250000 | 0.000000 |
| 0.000000 | 0.541667 | 0.711806 | 0.531250 | 0.000000 |
| 0.000000 | 0.250000 | 0.552083 | 0.000000 | 0.000000 |
| 0.000000 | 0.000000 | 0.319444 | 0.000000 | 0.000000 |

Convolved array, second iteration:

| | | | | |
|---|---|---|---|---|
| 0.000000 | 0.000000 | 0.227527 | 0.000000 | 0.000000 |
| 0.000000 | 0.228299 | 0.421441 | 0.227865 | 0.000000 |
| 0.000000 | 0.397859 | 0.517843 | 0.381655 | 0.000000 |
| 0.000000 | 0.227431 | 0.404803 | 0.000000 | 0.000000 |
| 0.000000 | 0.000000 | 0.210889 | 0.000000 | 0.000000 |

Convolved array, third iteration:

| | | | | |
|---|---|---|---|---|
| 0.000000 | 0.000000 | 0.162971 | 0.000000 | 0.000000 |
| 0.000000 | 0.192027 | 0.316678 | 0.191111 | 0.000000 |
| 0.000000 | 0.296025 | 0.383080 | 0.277529 | 0.000000 |
| 0.000000 | 0.190158 | 0.297211 | 0.000000 | 0.000000 |
| 0.000000 | 0.000000 | 0.143504 | 0.000000 | 0.000000 |

FIG. 7A

Original array:

| | | | | |
|---|---|---|---|---|
| None | None | Average | None | None |
| None | Few | Most | Few | None |
| None | Most | All | Most | None |
| None | Few | Most | None | None |
| None | None | Average | None | None |

Convolved array:

| | | | | |
|---|---|---|---|---|
| None | None | Few | None | None |
| None | Few | Average | Few | None |
| None | Average | Most | Average | None |
| None | Few | Average | None | None |
| None | None | Few | None | None |

Convolved array, second iteration:

| | | | | |
|---|---|---|---|---|
| None | None | Few | None | None |
| None | Few | Average | Few | None |
| None | Few | Average | Few | None |
| None | Few | Average | None | None |
| None | None | Few | None | None |

Convolved array, third iteration:

| | | | | |
|---|---|---|---|---|
| None | None | None | None | None |
| None | None | Few | None | None |
| None | Few | Few | Few | None |
| None | None | Few | None | None |
| None | None | None | None | None |

ACCESS CONTROL LIST WITH CONVOLUTION-WEAKENED AUTHORIZATION

FIELD OF THE INVENTION

The invention generally relates to the field of computer systems and software, and more particularly, to electronic access rights.

BACKGROUND OF THE INVENTION

The software industry has made wide use of access rights in many different kinds of applications, most notably operating systems and databases. Access rights are usually stored in static structures called access control lists (ACLs). Setting up, maintaining, and modifying ACLs is not a straightforward task. ACLs have limited scope and only regulate the relationship between data and immediate users of that data. There is presently no way to transmit access rights from a granting authority to a grantee and force the access rights to change upon receipt by the grantee. For example, if a user A is given access to a file X in a folder F located on a shared volume V, user A cannot be prevented from transmitting file X to any other individual or from transmitting any other file in the folder F as well.

Database systems also maintain protection schemes. Again, if a user B has access to a record R in a table T in a database D, as a rule, user B cannot be prevented from forwarding this information to third parties.

There are several current and emerging devices, systems, and policies for which privacy and security issues have become more acute. Computers, for example, are routinely under attack by viruses, worms and other malicious software. Computer users have been greatly inconvenienced by such software, suffering slowdowns, corrupted data and, at the extreme, lost or stolen data. Financial systems have also had their share of problems, ranging from lost to stolen information. Moreover, as an example of a national policy, the Health Insurance Portability and Accountability Act of 1996 (HIPAA), mandates strict confidentiality rules for the handling of medical information.

The confidentiality and integrity of medical information, in particular, is of growing concern because the medical community has not seen sufficient urgency or need to modernize medical information systems. Presently, these systems are fragmented, archaic, unsecured, and incompatible with each other. Individuals increasingly express concerns about the privacy and security of their own personal medical information.

Today, databases containing information about hundreds, thousands, or even millions of individuals are treated as commodities to be bought, sold and exchanged by companies and individuals. Individuals referenced in these databases almost never know that their personal information has been sold or transmitted. Most of the time such exchanges and use of personal information are benign, but many recent cases of malicious use or pirated data cause great concern among government, industry and privacy groups. There is thus a need for tools that increase the security and privacy of information readily address issues raised by HIPAA and consumer concerns about personal data.

SUMMARY OF THE INVENTION

Briefly, according to an embodiment of the invention a system and method for granting and transmitting access rights to data, the method includes steps of: receiving a request for information relating to a specified individual, wherein the request identifies a person requesting the information; determining the degree of relationship between the person requesting the information and the individual to whom the information relates; retrieving access rights for the requesting person from a repository; determining the owner of the rights as well as the rights that owner has granted to secondary parties; and determining, managing and transmitting to second parties said access rights modified to permit or deny the second party to further transmit, modify, change or delete owner's information to third parties.

DETAILED DESCRIPTION

Definitions

Checksum and mdsum are algorithms used to verify data integrity.

A convolution is a mathematical operation performed by applying one matrix to another to produce a third matrix. The operation can be thought of as a reverse magnifying glass. Instead of enlarging an area, making it easier to view, a convolution makes an area less clear. A piece of information that has been processed by a convolution operation has been convolved.

A database is a collection of information organized in such a way that a computer program can quickly select desired pieces of data. One can think of a database as an electronic filing system.

A fuzzy value is a range of numeric I values, rather than one particular value. Many sets of fuzzy values can be constructed. In one example, the value 0, which can be interpreted as meaning "none" can be represented by a set of real-number values in the range 0.00 to 0.10.1 numbers in the range 0.90 to 1.00 can represent the value 1, and can be interpreted as meaning "all".

A matrix is a collection of items arranged in a table of rows and columns.

A permission is a right to perform an action. For example, allowing a relative to view one's records is a "read" permission.

A relative is a person who is related by bloodline. Examples include siblings, parents, children and cousins.

A relative class is a group of relatives all related to the same extent. An example is all of one's birth children.

Relative distance is the generational distance from an individual. A child is one generation removed from an individual, as is a parent. Grandparents and grandchildren are two generational steps distant.

A repository refers to a central location where data is stored and maintained. Multiple databases and files are located in a repository for distribution over a network.

Self-contained applications are computer programs that do not permit data to be shared with other applications.

Figure 1:
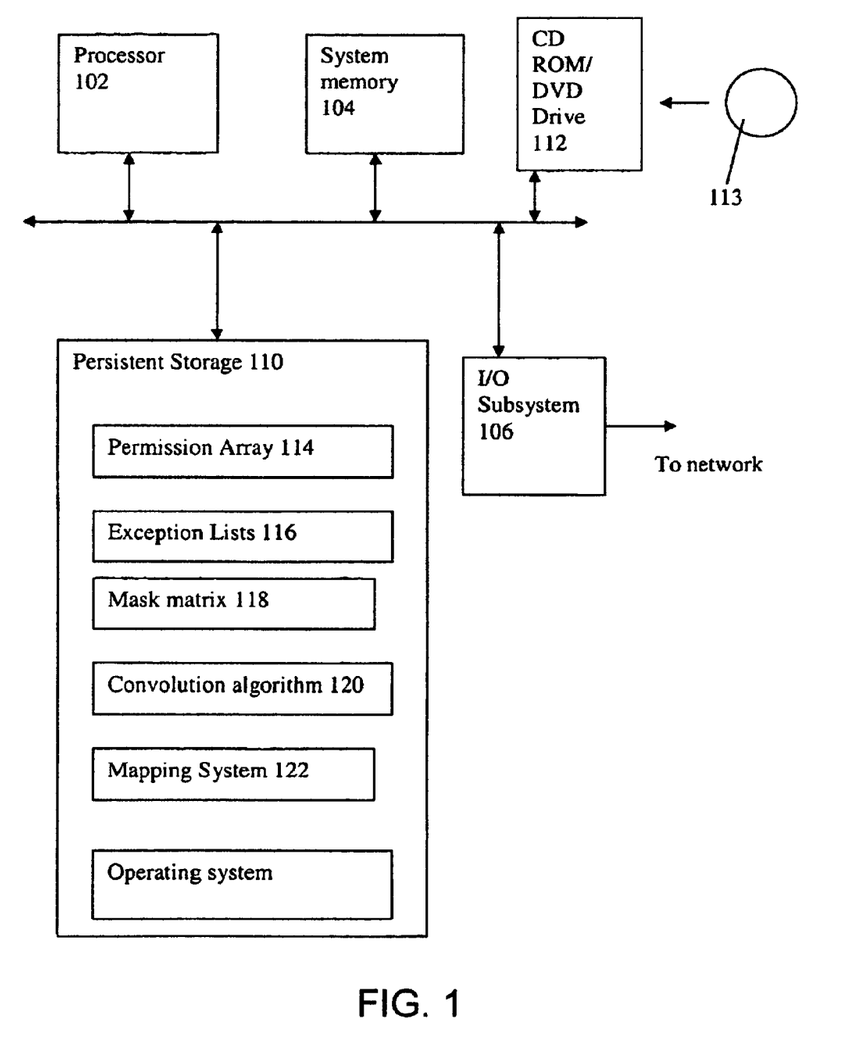
FIG. 1 is a simplified block diagram of an information processing system according to an embodiment of the invention.

Referring to FIG. 1, we show an information processing system 100 configured to operate as an embodiment of present invention. The system 100 comprises a processor 102, a system memory 104, such as a random-access memory, an I/O subsystem 106 which may include end user interfaces and an interface to a wide-area network. The system 100 also includes a removable media drive 112 for CD ROM or DVD media 113.

A persistent storage subsystem 110 comprises a multi-dimensional array of access rights or permissions 114. The array dimensions comprise: relation distance; relation or relation class; operations permitted to that relation or relation class; and starting and ending times for the permissions.

Figures 5, 6:
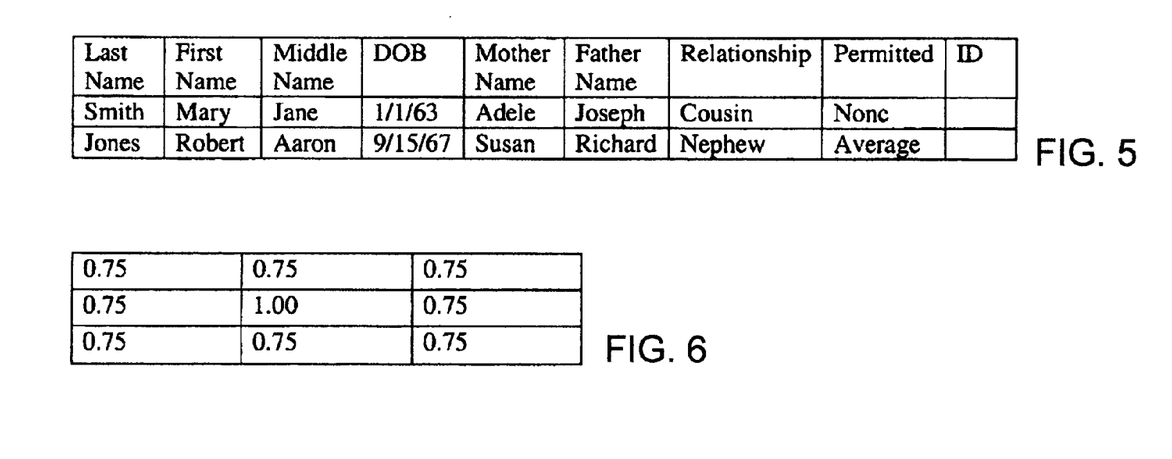
FIG. 5 illustrates an exception list
FIG. 6 illustrates a mask matrix.

The subsystem 110 further includes a set of exception lists 116. Exception lists are exceptions to a general rule. An example is a set of access rights granted to all siblings except the youngest. Another example is shown in FIG. 5.

The subsystem 110 further includes a convolution mask matrix 118. This matrix 118 defines the extent to which an entry in the permissions array is degraded. All neighboring components in the permissions array are "weighted" according to the values in the mask. An example mask matrix is shown in FIG. 6.

The subsystem 110 further includes matrix convolution algorithm software 120. This algorithm applies the mask array to a component in the permissions array to find new permission values. The effect is similar to convolution operations performed in image processing applications to degrade images or make them less focused. This convolution "degrades" the permissions array. For instance, a recipient of data receives information, but the "forwarding" permission will have been degraded to a level that does not permit further transmission to third parties.

The subsystem 110 further includes a mapping system 122 for converting numeric values to "fuzzy" logic values and fuzzy logic values back to numeric values. Fuzzy logic values are quantities such as "all," "none," "most," or "few." Such values are useful and meaningful to individuals but not to computers processing algorithms such as convolutions. Thus, the mapping system 122 converts fuzzy values to numeric values between 0.0 and 1.0. "All" converts to 1.0, "none" converts to 0.0 and all other fuzzy values are mapped to numeric values between 0.0 and 1.0.

Permissions

An aspect of the invention comprises a mechanism for enforcing access rights to data even after the data has been transmitted to a receiving party. This is accomplished by requiring that persons having relations "beyond" the limits of the array have no rights to the data. In other words, relatives not specifically listed in the array have no rights.

Figure 2:
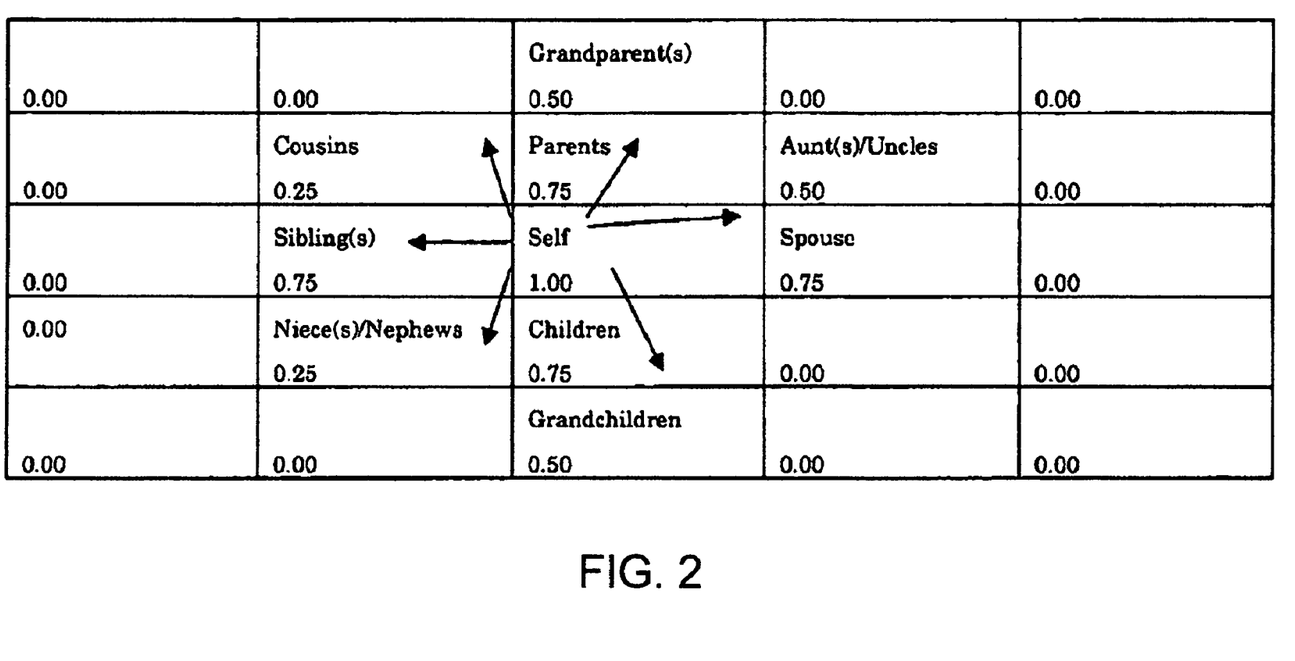
FIG. 2 illustrates a permissions array.

Referring to FIG. 2, there is shown a simplified diagram of a permissions array. At the center of the array is an entity that we call "self" and that represents the individual who owns the data. All access rights are valued between 0.0 and 1.0, with 0.0 having no rights and 1.0 having full rights. Self has all rights, while individuals in blank cells have no rights. Other relations have varied amounts of rights (e.g., the spouse has 0.75).

Fuzzy Logic Values

Figure 3:
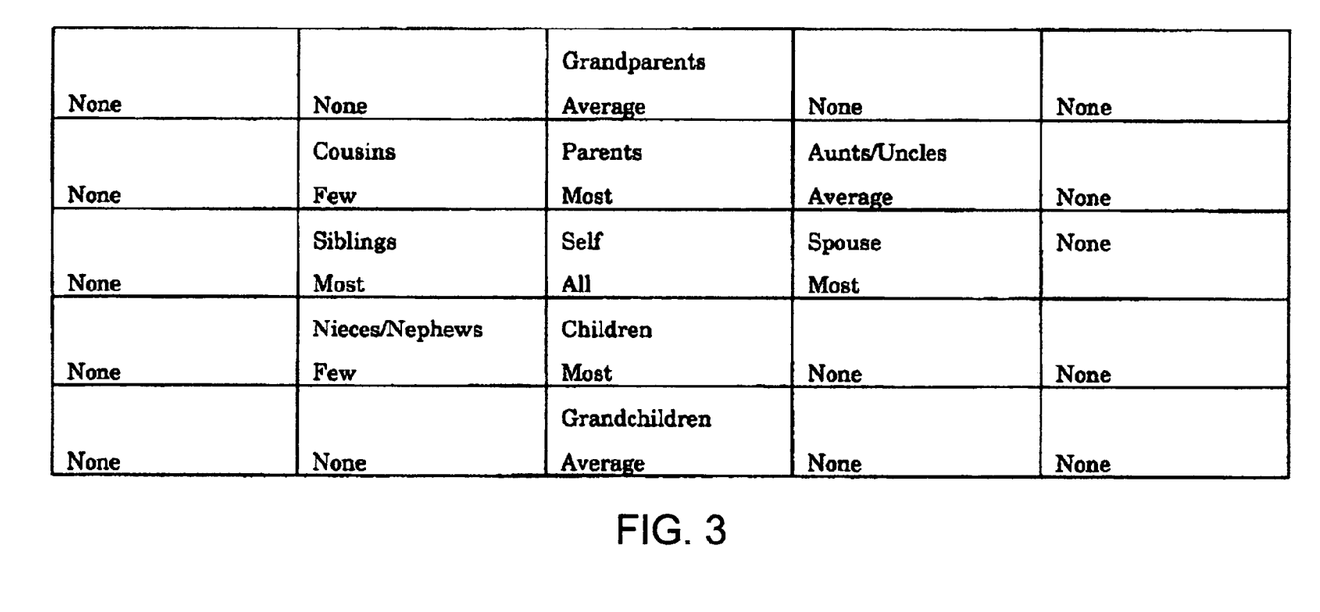
FIG. 3 illustrates a "fuzzy logic" rendition of a permissions array.

Computers are well-equipped to use actual numeric values, but individuals find descriptive terms more useful. "None" and "All", for example, are far more meaningful to the average person than 0.0 and 1.0. Thus, a mapping operation turns the array of FIG. 1 into the array shown in FIG. 3.

Figure 4:
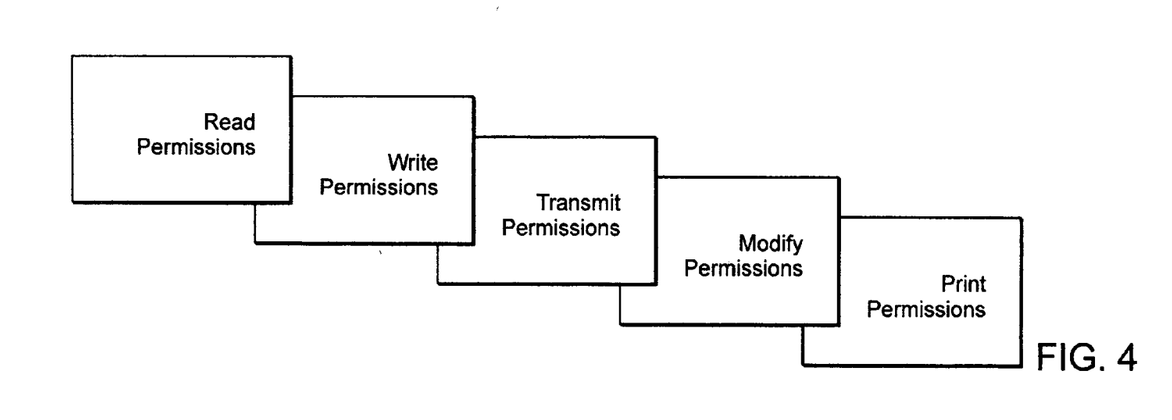
FIG. 4 illustrates a multi-dimensional permissions array.

Referring to FIG. 4, there is shown a multi-dimensional permission array. Because the permissions array is multi-dimensional, additional access rights are encoded in additional layers of the permissions array. Permissions array may be stored as a "C" language structure of the form:

Permissions[NumRows][NumCols][NumPermissions], where NumRows is the number of rows in the permission array, NumCols is the number of columns in the permissions array, and NumPermissions is the number of different kinds of access permissions.

Permissions have the following meanings:

a. Read: permission to access and review information;
b. Write: permission to add new information;
c. Transmit: permission to forward information to a third party;
d. Modify: permission to change existing information; and
e. Print: permission to print information.

All of these permissions are not necessarily available or offered in an application. For example, in a medical setting where patients wish to view their records, the only permissions offered to the patients would be "read," "print," and "transmit" because it makes no sense and, in fact, would be deleterious to permit patients to change medical diagnoses.

Mask Array

A "mask" array, is information that, when applied to a layer of a permissions array, forms a new layer with the same or lower level of permissions. For example, a mask array can be a square, with dimensions 3×3. See FIG. 6.

Exception Lists

Referring to FIG. 5, there is shown an example of an exception list. The individual who owns the information may also create "exception lists" which indicate exceptions from a general rule, such as "all siblings except for Lisa." It is also possible to indicate an entire class of individuals who are excluded from accessing data, for example, "all cousins." Exception lists can be implemented as database tables. Assume a user named "Ann" is a user of the application. An example of an exception list that Ann might create is the following:

Exception lists may have less, more or different kinds of fields depending on the real-world application. In this example, Robert Jones is a nephew of Ann and has "average" rights while Mary Smith is Ann's cousin and has no rights to Arm's information.

Note that one small change in exception lists or access rights can have large effects with respect to who has what rights to what data. Giving Mary Smith greater access rights means that there is the potential that some or all of Ann's information could be viewed by Mary Smith's direct relatives (note that Mary's relatives must also be Ann's relatives). On the other hand, changing Robert Jones's permissions to "None" would shut off all access to's information to Robert and his direct relatives (note that Robert's relatives must also be Ann's relatives).

Mask Array

Referring to FIG. 6, a convolution mask matrix is illustrated. The convolution mask matrix indicates how quickly information must decay when transmitted from individual to individual. Because the permissions array is fairly small, the mask matrix is also small, only 3×3, or 3 rows by 3 columns. At the center of the matrix the value of 1 indicates that all information may be accessed. Note that the effect of moving "off-center" is to start choosing values that are less than the original (less than one). This is the permissions degradation effect mentioned above.

The Convolution Algorithm

The traditional convolution operation is defined by the following equation:

$$Out_{i,j} = \sum_{m=0}^{M-1} \sum_{n=0}^{N-1} In_{m,n} Mask_{i-m,j-n}$$

Where Out is the output array, In is the input array and Mask is the mask array.

The traditional convolution operation is used in image processing applications where the detection of "edges" is important. That is, the mask array cannot be applied to any element or elements beyond the edge of the input array. We use a new algorithm that instead assumes that there is no edge. Elements of the In array accessed beyond its edge are assumed to have a value of 0.0 or "none."

The effect of performing a convolution function on a particular element in an array is to "defocus" the value. According to the invention, the permission value can remain the same or weaken. Thus, if a permission value is 1.00 and it is surrounded by values less than 1.00, and the mask array is defined by values less than or equal to 1.00, then the output value will be less than the input value. Thus, the new permissions associated with the data has been weakened. The originator grants a recipient permission to access data, but the recipient cannot grant permission to third parties to view the originator's information if the convolved value has dropped below a specific value. The other permissions, residing in separate layers of the permission matrix are similarly convolved, but have their own threshold values and mask arrays.

One can think of the convolution operation as being the reverse of a magnifying glass that brings images into clearer focus. Convolutions make images less sharp and can be thought of as being the inverse of a magnifying glass. When smaller values are used in the mask array and/or the permissions array, the result of the convolution is a permissions array that is "less sharp" than the original permissions array. Using the magnifying glass analogy for example, only information that was originally large and bold is still visible after a convolution. In this case, large and bold corresponds to information that has a high permission value.

Consider for example, an individual "Self," or "S," permits a sibling T, to view "most" of S's information. When T receives S's information, the permissions associated with that information are also received. A sibling T permits his own child, C, to view all information T possesses. The information made available to C by T does not necessarily include S's information if S has not specifically granted permission to allow C to view that information.

Convolutions can be further divided into "whole-array," "half-array," and "quarter array" operations. A whole-array convolution applies the mask array over the entire permissions array. The half-array operation applies the convolution over one half of the array, for example to ancestors only.

The quarter-array operation applies the correlation to one quadrant of the permissions array. Convolving in order to find weakened permissions for a grandparent, for example, probably only needs to consider relatives in the grandparent quadrant.

Convolutions are sensitive to "edges" in images. But a permissions array really has no edges. Anyone further removed from "Self" entity is assumed to have (and defaults to) "no" permissions. The convolution operation can be modified to take advantage of this fact. The modified, whole array convolution algorithm, is here expressed in "C" language code:

```
void convolve ( PermitArrays *in,
                PermitArrays
                *out, MaskArray
                *mask, int layer )
{
    int i, j, m, n, idx, jdx;
    float ms, im, val, prod, tmp;
    for ( i = 0; i < 5; ++i )
        for ( j = 0; j <++i )
        {
            val = 0;
            for ( m = 0; m < 3; ++m )
                for ( n = 0; n < 3; ++n ) {
                    ms = mask->maskdata[m][n];
                    i d x = i - m +
                    1; jdx = j - n +
                    1;
                        if ( idx >= 0 && idx < 5 )
                        {
                            if ( jdx >= 0 && jdx < 5 )
                                im   in->data[idx][jdx];
                            else
                                im = 0;
                        im = 0;
                    prod = ms * im;
                    val += prod; }
            tmp = val / 9;
        }
    }
    tmp = 0.5 * ( in->data[i][j] + tmp ); if ( tmp
    > in->data [i] [j ] )
        tmp = in->data[i][j];
    out->data[i][j] = tmp;
```

Figure 7A:
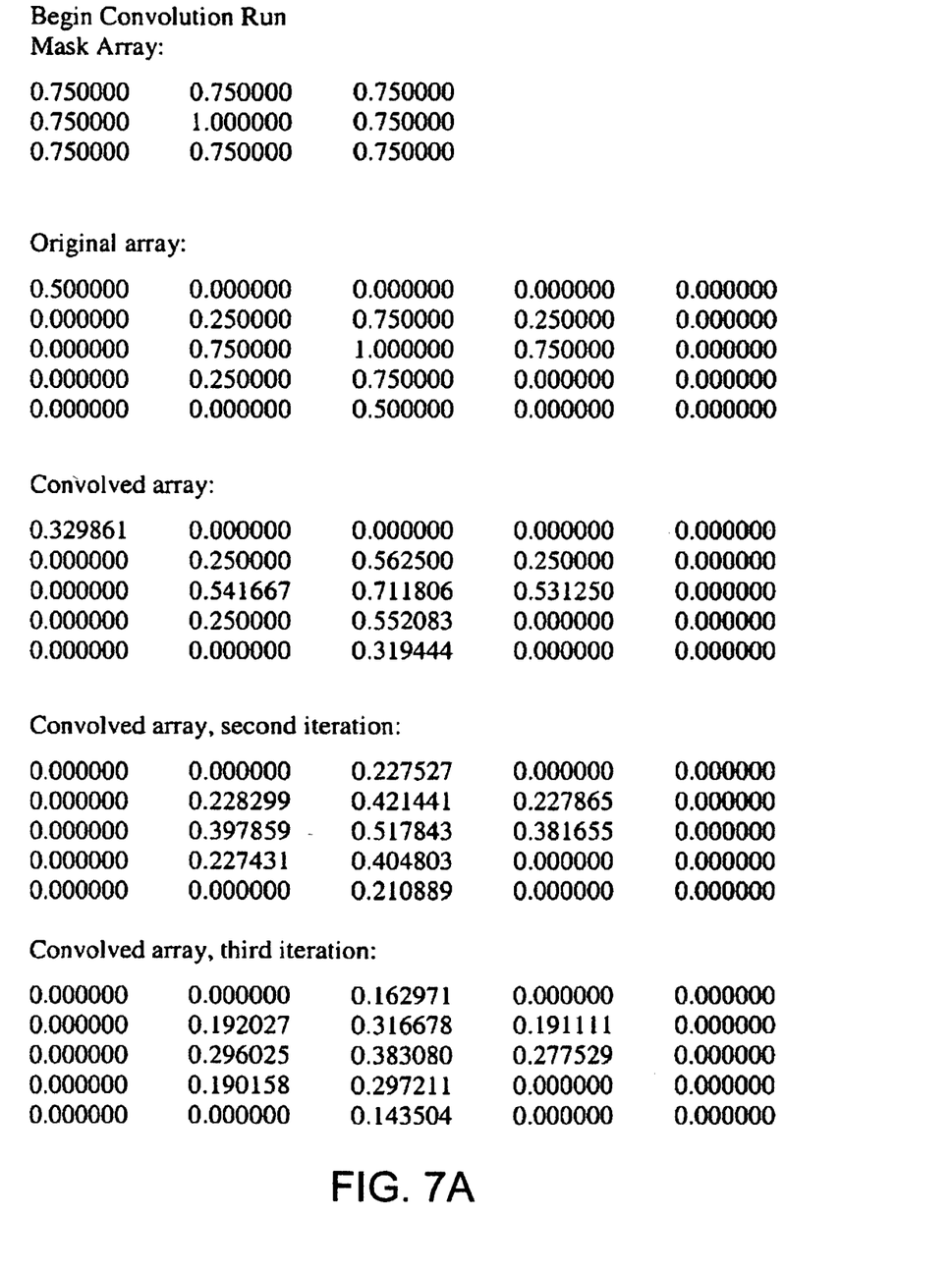
FIGS. 7A and 7B show an output run of a program incorporating a convolution algorithm in numeric and fuzzy form, respectively.

FIG. 7A shows an output run of a program incorporating a convolution algorithm. Note that the array entries decrease in value after each iteration of the convolution operation. If the convolution function is invoked enough times, all the array values eventually decrease to zero.

Concentrating on the entry in the first row, third column, the original value is 0.5. One iteration of the function produces a value of 0.329. A second iteration produces 0.227 and a third iteration produces a value of 0.162.

These values can be interpreted as follows. The "grandparent" is permitted a permission of 0.5. If another relative imports data from the grandparent, that relative receives a permission value of 0.329. A relative of that relative receives a permission value of 0.227; a relative of that relative receives a permission value of 0.162 and so forth. At some point defined by an application, the permission value falls to a low enough level that the permission value is interpreted as zero, or no permission.

The array values always decrease in value as long as the mask array and permissions array values are less than one. Thus, permissions decrease every time data is transmitted from one relative to another.

Inside an application, information transmitted from one relative to another is accompanied by both the permissions array and the mask array. At each step, a checksum or md5sum are calculated to ensure that the correct permissions are present. If an incorrect checksum or md5sum is detected or if the checksum or md5sum are missing, the permissions values are assumed to be zero; i.e., permission is not granted to access the data.

Fuzzy Value Translation

Figure 7B:
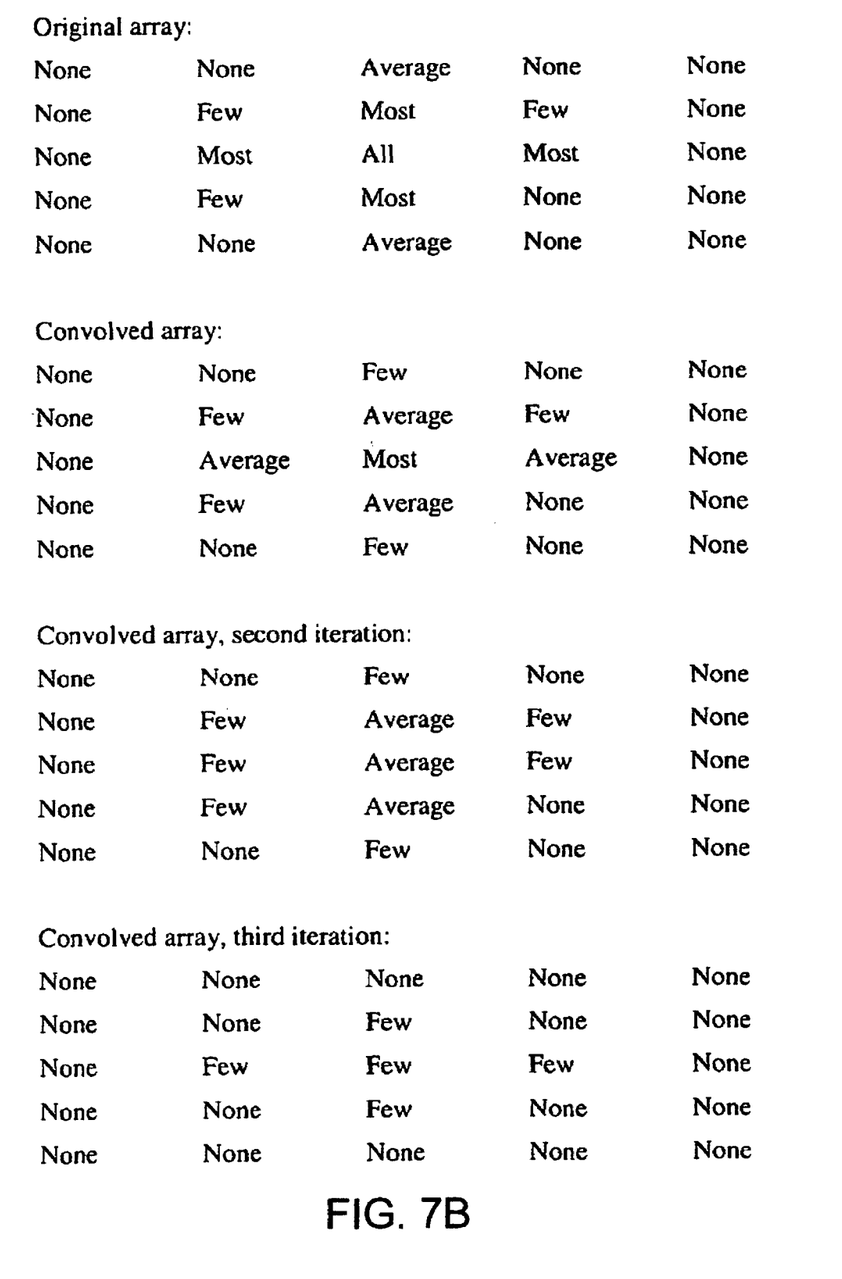

Numerical values do not necessarily hold much meaning for average users. It is much more convenient for a user to say that a parent has "Most" access rights as opposed to access rights equal to "0.75". For this reason, the invention includes a translation function that converts numerical values to "fuzzy" values and vice versa. The example output shown in FIG. 7A is repeated in FIG. 7B, but with fuzzy values:

Note again the value in the first row, third column. Starting with a value of "Average", the entry changes to "Few", "Few" and "None" respectively as the convolution function is repeatedly invoked. After a number of iterations, all entries would eventually converge on "None". Fuzzy values depend on the numerical range set for each fuzzy "range." In the example of FIGS. 7A and 7B, the ranges were set as follows:

| Fuzzy value | Numerical range |
| --- | --- |
| "None" | <=0.20 |
| "Few" | >0.20 and <=0.40 |
| "Average" | >0.40 and <=0.60 |
| "Most" | >0.60 and <=0.80 |
| "All" | >0.80 |

Figure 8:
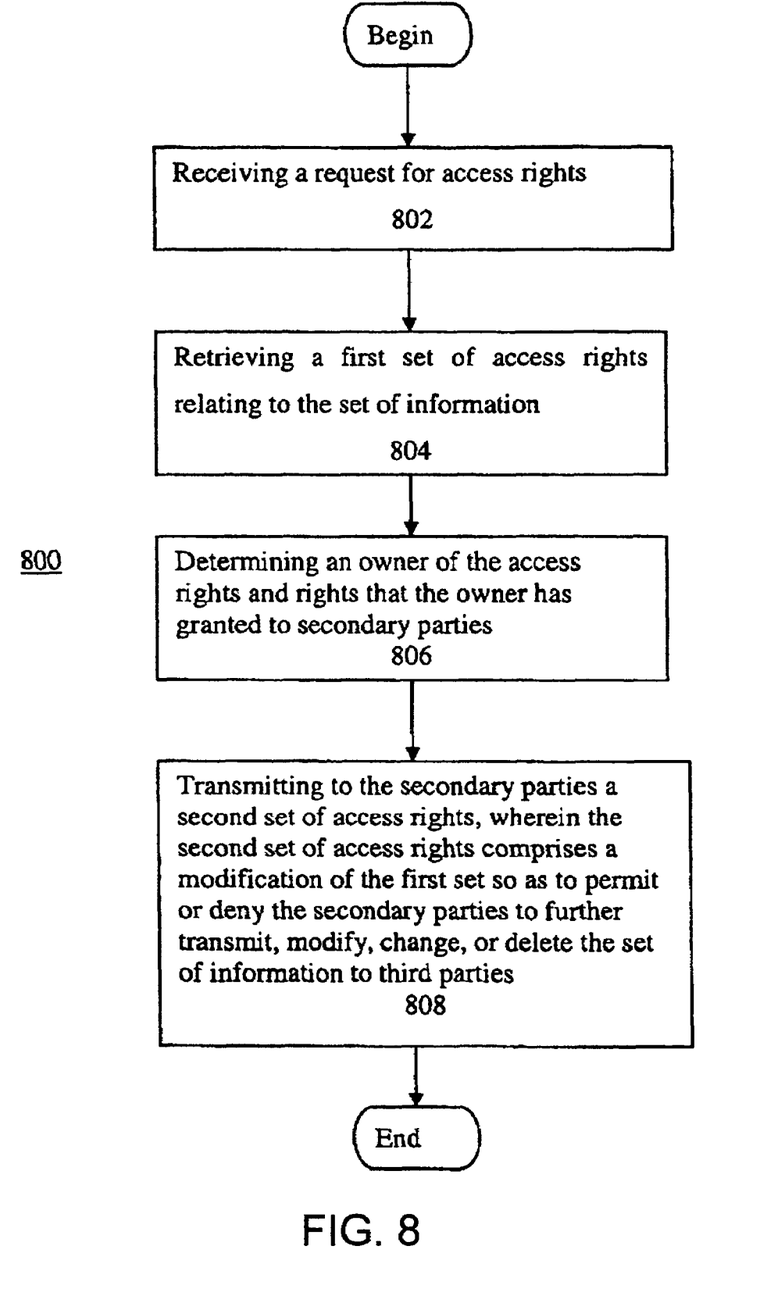
FIG. 8 is a flowchart of a method according to an embodiment of the invention.

The reverse operation, converting a fuzzy value to a numerical value can be accomplished in many different ways. A value of "Average", for example, could be set to the low point in the range 0.40-0.60, or the high point, or the mean, or some other value in the range. The invention assumes that the conversion will result in a numerical value equal to the largest value in the range. This is because the convolution function can cause entries to lose value quickly, again depending on the entries in the Permissions array and the Mask array. So using a mean or low value would tend to weaken permissions too quickly. If a user has specified a fuzzy value of "All" and "All" were set to the actual numerical value of 1.0, one iteration would cause a drop to either "All" or "Most", whereas setting the numerical value to 0.80, for instance, might cause a drop to "Average"—not at all what the user had in mind. Referring to FIG. 8, we show a flowchart of a method 800 performed by information processing system 100 according to an embodiment of the invention. In step 802, the system receives a request for access rights. In step 804, the system 100 retrieves a first set of access rights relating to the set of information. In step 806, the system 100 determines an owner of the access rights and rights that the owner has granted to secondary parties. In step 808, the system 100 transmits to the secondary parties a second set of access rights. The second set of access rights comprises a modification of the first set so as to permit or deny the secondary parties to further transmit, modify, change, or delete the set of information to third parties.

Therefore, while there has been described what is presently considered to be the preferred embodiment, it will understood by those skilled in the art that other modifications can be made within the spirit of the invention.

We claim:

1. A method of providing access rights to a set of information within a closed environment, comprising:
   receiving a request for access rights from a member of the closed environment;
   retrieving a first set of access rights relating to the set of information;
   determining an owner of the access rights and rights that the owner has granted to secondary parties who are also members of the closed environment; and
   transmitting to the secondary parties a second set of access rights, wherein the second set of access rights comprises a result of a mathematical operation on a data structure representing the first set so as to permit or deny the secondary parties to further transmit, modify, change, or delete the set of information to third parties who are also members of the closed environment.

2. The method of claim 1, wherein the retrieving includes retrieving access rights assembled in array form, every element of the array from a set of values from 0 to 1, both dimensions of the array being odd, a central element of the array having a value equivalent to unity, the central element of the array representing a "self" value.

3. The method of claim 2, wherein the access rights represent permissions accorded to one or more of a set consisting of parents, grandparents, siblings, and children.

4. The method of claim 1, further comprising performing a matrix convolution operation on the first set of access rights, the operation producing a set of access rights that decreases the access rights provided to the secondary parties.

5. The method of claim 1, wherein the access rights may be accorded or denied to one or more relatives or to an entire class of relatives.

6. The method of claim 1, wherein the transmitting a second set of access rights comprises providing a permissions array comprising numeric values corresponding to a degree of permission.

7. The method of claim 1, wherein the transmitting a second set of access rights comprises providing a permissions array comprising fuzzy logic values corresponding to a degree of permission.

8. The method of claim 1, wherein the second set of access rights is a weakened version of the first set of access rights.

9. The method of claim 1, wherein the second set of access rights is the same as the first set of access rights.

10. An information processing system for storing information relating to an individual and for providing access to the information, the system comprising:
    a multi-dimensional array of access rights relating to a set of persons or classes of persons having a relation with the individual;
    a set of exception lists relating to the array of access rights;
    a convolution mask matrix for defining an extent to which an entry in the array is degraded as a function of the relation between the individual and any one of the set of persons or classes of persons that requests information;
    a processor configured to perform a matrix convolution algorithm, applying the the mask array to a component in the permissions array to find new permission values; and
    a mapping system to convert numeric values to fuzzy logic values and fuzzy logic values back to numeric values.

11. A method of providing information relating to a specified person, comprising steps of:
    receiving from a requesting party a request for information relating to a specified individual, wherein the request also identifies the requesting party; retrieving a permissions array for the specified individual;
    determining a relation between the requesting party and the specified individual;
    performing a convolution function on the permissions array to provide a modified permissions array, wherein the convolution function corresponds to the relation determined;
    providing the requested information to the requesting party based on the modified permissions array.

* * * * *